| United States Patent Office | 3,481,611
Patented Dec. 2, 1969 |
|---|---|

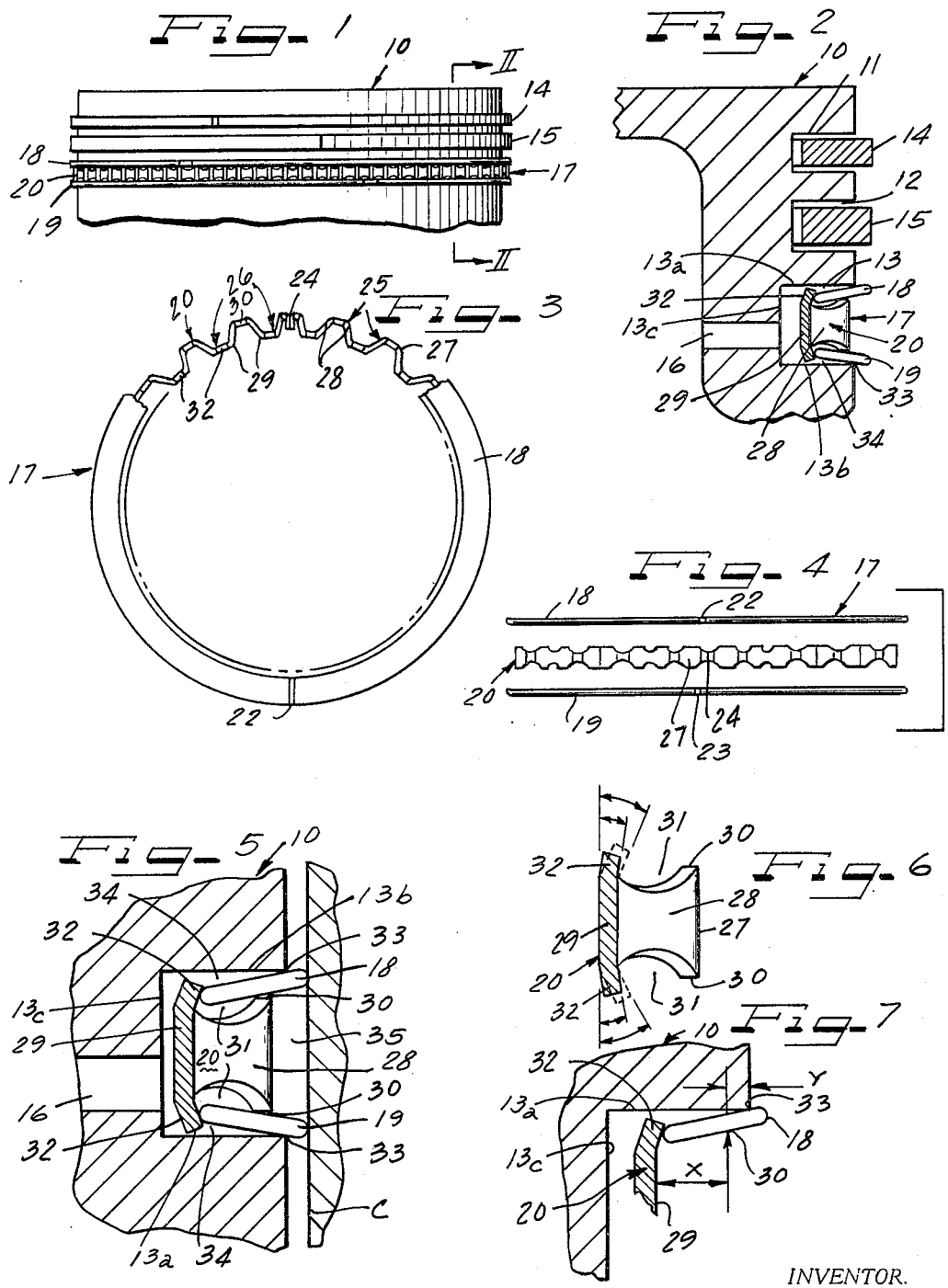

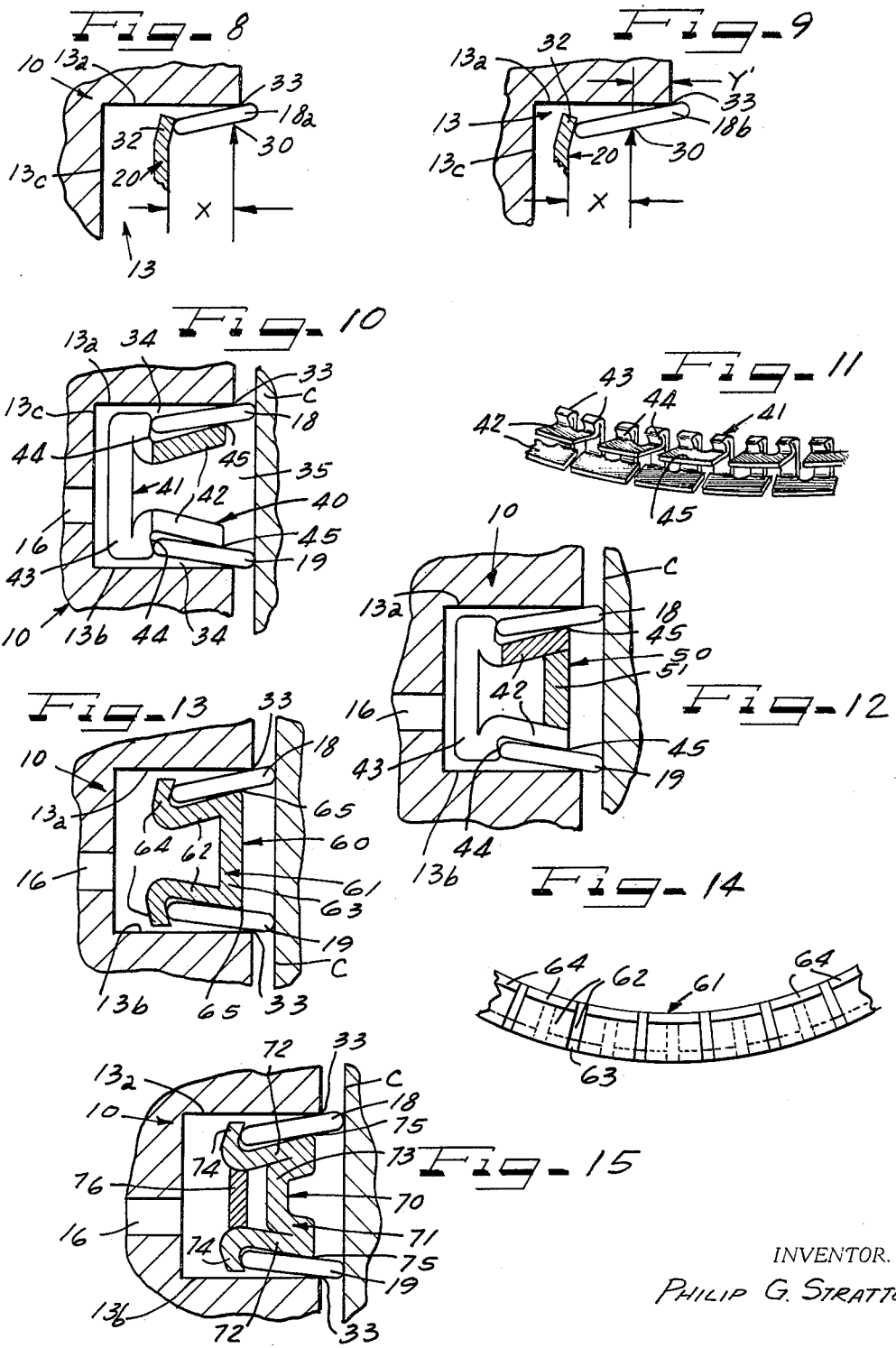

3,481,611
OUTER SIDE SEALING OIL CONTROL RING
Philip G. Stratton, Northville, Mich., assignor to Ramsey Corporation, St. Louis, Mo., a corporation of Ohio
Filed Mar. 5, 1968, Ser. No. 710,556
Int. Cl. F16j 9/06, 9/12
U.S. Cl. 277—139     11 Claims

ABSTRACT OF THE DISCLOSURE

An oil control piston ring assembly having a spacer-expander ring providing fulcrum supports for rail rings or thin segment type piston rings while dishing and urging these rings into side-sealing engagement with the side walls of a piston ring groove at the outer peripheral portions of these side walls. The rail rings are flat in their free state but are dished or inclined by angled shoulders or tabs on the spacer-expander ring to diverge from their inner to their outer edges and form seals with the peripheries of the ring groove side walls. This diverging dished condition of the rail rings allows increased clearance between the assembly and the ring groove walls which enhances oil drainage while at the same time providing an inwardly opening clearance gap having a freeing angle instead of a wedging angle which will minimize lacquer buildup and sticking of the assembly in the ring groove. The fulcrum supports for the rail rings are closer to the outer peripheries than to the inner peripheries of these rings and the radial positions and axial heights of these supports are correlated with the angle of convergence of the expanding force to provide the desired side-sealing load and angle of inclination of the rings. The fulcrum arm length of the rail ring between the fulcrum support and the angled shoulders or tabs is preferably about 50% to 75% of the radial depth of the ring. The sealing contact area of the ring with the side of the ring groove is preferably positioned to provide a fulcrum arm of from 10% to 30% of the radial depth of the rail ring.

BACKGROUND OF THE INVENTION

This invention relates to the field of packing or piston rings, preferably oil control rings for the pistons of internal combustion engines.

Assemblies of dished thin rail ring and spacer-expander rings are known, for example, in the William Cords U.S. Patent 2,231,801 issued Feb. 11, 1941. These assemblies, however, provided no fulcrum supports for the rail rings and require specially bent and hardened dished rail rings capable of maintaining the dished condition without support from the spacer-expander ring. In such assemblies the rail rings tended to flop back and forth in operation resulting in an undesired paint-brush effect producing a noisy operation and enhancing wear. In addition, oil drainage was blocked by the assembly.

The deficiencies of the pre-dished unsupported rail ring assemblies of the prior art were avoided in the assembly covered by the Melvin W. Marien U.S. Patent 2,817,564 issued Dec. 24, 1957, where the rail rings were amply supported by the spacer-expander and where the spacer-expander provided an axial as well as a radial expanding force to dish the rail rings. However, in the Marien patent the expanding force of the spacer-expander is both axially outward and radially outward so that side-sealing is effected at the inner peripheries of the rail rings. The rail rings thus converge from their inner to their outer peripheries and provide outwardly opening gaps between the side walls of the ring groove and the rings. These gaps provided wedging angles which can receive lacquers and other deposits built up on the pistons upon prolonged usage. Excessive lacquer build-up may cause the assembly to stick in the groove thus interfering with its sealing and oil control function.

SUMMARY OF THE INVENTION

The present invention now minimizes sticking of oil control rings by inclining the rail rings or segments so that they sealingly engage the sides of the ring groove at or near the outer periphery of the ring groove. This provides self-cleaning gaps between the ring groove sides and the rail rings. The invention also provides controlled loading of the rails or segments with the ring groove sides and utilizes flat rail rings or segments that are dished to the desired extent by the spacer-expander ring.

The spacer-expander may take many different forms and is preferably a sheet metal ribbon either corrugated or channel-shaped to provide the fulcrum supports and expansion tabs or shoulders for the rails. This spacer-expander is of the self-expanding garter spring type which is not bottomed on the ring groove to exert its expansion force and is sufficiently open to accommodate free flow of oil therethrough. The shoulders or tabs which engage the inner peripheries of the rail or segment rings are inclined axially outward and radially outward at angles which may be widely varied to co-act with the fulcrum support points on the spacer-expander for inclining the rail as desired. The spacer-expander thus can have a smaller axial dimension than is required for side-sealing expanders which cause the rail rings to dish in converging relation.

It is then an object of this invention to provide a circumferential type expander and segment oil ring combination which side-seals at the outer peripheral portions of the ring groove.

Another object of the invention is to provide an oil control ring for a piston which has diverging ring segments sealed against the outer peripheral portions of the side walls of the ring groove under controlled loads developed by a spacer-expander.

A specific object of the invention is to provide a three-piece circumferential type expander and segment oil ring combination which develops a free angle relationship with the sides of the ring groove to minimize sticking of the assembly in the groove.

Another specific object of the invention is to provide a spacer-expander ring for rail ring type oil control rings which provides a fulcrum support for the rail rings and a converging expansion force to dish the rail rings on the fulcrum points causing them to sealingly engage the outer peripheral portions of the sides of the ring groove.

Other and further objects and features of the invention will become evident to those skilled in the art from the following descriptions.

BRIEF DESCRIPTION OF THE DRAWINGS

FIGURE 1 is a fragmentary elevational view of the top of a piston having piston rings in its grooves including an oil control ring assembly of this invention.

FIGURE 2 is an enlarged fragmentary vertical cross-sectional view taken along the line 2—2 of FIGURE 1.

FIGURE 3 is a plan view of the oil control ring assembly of this invention with parts broken away to show underlying parts.

FIGURE 4 is a side elevational view of the oil ring assembly of this invention with the components in separated relation.

FIGURE 5 is an enlarged fragmentary cross-sectional view of a piston and cylinder illustrating the oil control ring of this assembly in the oil groove of the piston and radially compressed by the cylinder.

FIGURE 6 is a cross-sectional view of the spacer-expander of this invention diagrammatically illustrating a preferred range for inclination of the tabs or shoulders which act on the inner peripheries of the rail rings.

FIGURE 7 is a fragmentary cross-sectional view diagrammatically illustrating the manner in which the spacer-expander supports and dishes the rail ring and showing the fulcrum arms of the rail ring.

FIGURES 8 and 9 are views similar to FIGURE 7 diagrammatically illustrating the effect of variation of the radial depth of the rail ring on the fulcrum ratio.

FIGURE 10 is a view similar to FIGURE 5 but illustrating a modified spacer-expander according to this invention.

FIGURE 11 is a perspective of the spacer-expander in the assembly of FIGURE 10.

FIGURE 12 is a view similar to FIGURE 10 but illustrating a further modified spacer-expander.

FIGURE 13 is a view similar to FIGURE 12 but illustrating another modified spacer-expander in the assembly.

FIGURE 14 is a plan view of the spacer-expander of FIGURE 13.

FIGURE 15 is a view similar to FIGURE 13 but illustrating a further modification of the spacer-expander.

DESCRIPTION OF THE PREFERRED EMBODIMENTS

The piston 10 of FIGURES 1 and 2 is of a conventional type used in internal combustion engines and as such has a top ring groove 11, a middle ring groove 12, and an oil ring groove 13. The top groove 11 receives a conventional split solid cast iron compression or fire piston ring 14, the middle groove 12 receives a conventional split solid cast iron compression ring 15.

The oil ring groove 13 is usually wider than the grooves 11 and 12 and is joined through oil holes such as 16 with the interior of the piston. The groove 13 has a top radially extending side wall 13a, a radially extending bottom wall 13b parallel with the wall 13a and a vertical back wall 13c pierced at itervals by the oil holes such as 16.

According to this invention there is provided an oil control ring 17 in the groove 13. This assembly is composed of a top thin flat rail ring or ring segment 18, an identical bottom rail ring or ring segment 19 and an intermediate spacer-expander ring 20. The rings 18 and 19 are preferably composed of steel and have rounded outer peripheral edges covered with a hard corrosion and wear resisting metal such as chromium. The inner peripheral edges of the rail ring are also preferably rounded but need not be coated with the hard metal.

The rail rings 18 and 19 as shown in FIGURES 3 and 4 are split and have gaps 22 and 23 respectively between their split ends. The ring can be compressed from this free state wide gap condition to a closed gap or narrower gap condition. The gaps thus vary in operation to permit radial expansion and contraction of the rail rings.

The spacer-expander 20 of this invention is a corrugated steel ribbon with ends 24 abutted together. The ring 20 is radially contracted in operation and provides a circumferential spring exerting a uniform outward radial force around its entire periphery.

The ring 20 has a plurality of circumferentially spaced humps 25 around its periphery. These humps are radially separated by pockets 26 opening outwardly. About 36 humps 25 are usually provided on the ring 20.

Each hump 25 has a wide peripheral face or front leg 27 and side legs 28 diverging radially inwardly from the front face 27 to back walls or legs 29 forming the bottoms of the pockets 26 between the humps. The legs 28 are scalloped and decrease in axial height from the front faces or legs 27 to their mid-points and then increase in height to the back walls or legs 29. Thus, the front faces or legs 27 of the humps have rail ring supporting edges 30 at the outer peripheral portions of the humps and recesses 31 are provided along the length of the legs 28 on both sides of the edges 30.

The inner legs 29 have inclined tabs 32 extending axially and radially outward from their top and bottom edges to provide the abutment shoulders for engaging the inner peripheries of the rail rings 18 and 19. These tabs 32 preferably extend axially beyond the rail ring support edges 30 to insure contact with the inner peripheries of the rail rings.

As illustrated in FIGURE 6 the angle of inclination of the tabs 32 may be varied according to this invention from a preferred minimum of about 2° to a preferred maximum of about 13° from the vertical back walls or legs 29. As shown in FIGURE 3 the circumferential length of the tabs 32 is substantially coextensive with the circumferential length of the back walls or legs 29 although narrower tabs may be used.

The rail rings 18 and 19 supported on the edges 30 of the humps 25 with their inner peripheral edges engaged by the tabs 32 will be dished from their free state flat shape into dished shapes which diverge axially and radially outward from the tabs. The rail rings 18 and 19 will engage the outer peripheral portions of the ring groove side walls 13a and 13b as illustrated at points 33 in FIGURES 2 and 5. This dishing of the rails in the ring groove and sealing of the same against the outer peripheral portions of the side walls of the ring groove will provide gaps 34 between the rail rings and side walls. These gaps 34 open inwardly and increase in height as they progress inwardly to provide free draining communication with the bottom of the ring groove. Foreign material is therefore not trapped in the gaps and the gaps are washed by oil circulating from the oil holes into the ring groove. Lacquer build-up is therefore prevented and the assembly will not stick in the ring groove.

As shown in FIGURE 5 when the assembly is radially compressed from the free state condition of FIGURE 2 by the cylinder wall C the rail rings 18 and 19 are forced further into the ring groove and the spacer-expander is circumferentially compressed. Oil can circulate freely through the openings 31 provided by the scalloped side legs of the spacer-expander between the space 35 between the rail rings and the bottom of the ring groove while the rail rings seal the piston relative to the cylinder.

As shown in FIGURE 7 the edge 30 of the expander supporting the rail ring 18 provides a fulcrum for the rail ring and a fulcrum arm identified at X lies between the fulcrum point 30 and the inner edge of the rail ring engaged by the tab 32. This fulcrum arm X has a length greater than one-half the radial depth of the rail ring 18 and preferably about 52% to 75% of the radial depth of the ring. The rail ring 18 engages the outer edge of the side wall 13a of the ring groove at 33 and the fulcrum arm length Y between the fulcrum 30 and this outer edge 33 is less than the fulcrum arm length X providing a decided lever advantage for the loading of the rail ring against the side of the groove by the force exerted from the spacer-expander 20. The lever arm Y may preferably be from 10% to 30% of the radial depth of the rail ring 18.

It should be understood that the side-sealing load of the rail rings on the sides of the ring groove is controlled by the radial spring force of the compressed spacer-expander 20, the tab angle and the fulcrum arm length advantage between the fulcrum point and the inner periphery of the rail ring engaged by the spacer-expander.

In addition the side sealing load of the rail rings on the ring groove can be varied by changing the radial depth of the rail rings. Thus, as shown in FIGURE 8 a shallow rail ring 18a having a fulcrum arm length X between the fulcrum point 30 and the tab 32 of the spacer-expander will have practically no fulcrum arm on the opposite side of the fulcrum 30 corresponding with the arm Y of FIGURE 7 because the spacer-expander 20 will be positioned radially outwardly in the ring groove from the position it must assume with a rail ring having a greater radial depth, and the fulcrum 30 will be almost aligned with the sealing contact point 33 at the outer edge of the ring groove.

Conversely as shown in FIGURE 9 if the rail ring 18b has a radial depth greater than the ring 18 and the fulcrum arm X remains the same, the fulcrum arm Y' will be greater than the arm Y of FIGURE 7 and of course the lever advantage is decreased. In the FIGURE 9 embodiment the spacer-expander 20 is contracted further into the bottom of the ring groove and the disadvantage of the fulcrum arm relationship is offset by the increased spring loading force exerted by the spacer-expander 20.

The corrugated type spacer-expander 20 may be replaced with other forms of circumferential expansion spring rings including for example the form of FIGURES 10 and 11.

In the modified oil control ring assembly 40 of FIGURES 10 and 11 the rail rings 18 are supported on, dished, and expanded by a spacer-expander ring 41 of outwardly opening channel configuration. The ring 41 is thus generally U-shape in cross section with top and bottom legs composed of rows of circumferentially spaced segments 42 in staggered relation connected by vertical back legs 43. The segments 42 converge from their outer edges to outturned shoulders 44 providing the angled tabs for engaging the inner peripheries of the rail rings. The divergent outer ends of the segments 42 provide the fulcrum point supports for the rail rings at 45. The rails 18 are thus sealed against the outer peripheries of the ring groove side walls at 33 in the same manner as in the embodiment of the assembly 17 and the same inwardly opening gaps 34 are provided between the rail rings and the sides of the ring groove. Oil drainage occurs freely between the chamber 35 sealed off by the rail rings 18 and the interior of the piston through the spaces between the legs 43 and the segments 42. The assembly 40 operates in the same manner as the assembly 17.

In the embodiment of FIGURE 12 the oil control ring assembly 50 is substantially the same as the assembly 40 and the corresponding parts have been marked with the same reference numerals. In the assembly 50 the outer ends of the segments 42 are reinforced against inward collapse to provide more rigid fulcrum edges 45 by means of an insert support ring 51 which may be perforated to accommodate drainage and which wedges against the segments 42 near their outer edges. In addition this ring could be replaced wtih fingers or tangs lanced from the segments 42. The assembly 50 operates in the same manner as the assembly 40.

In the embodiment shown in the FIGURES 13 and 14 the oil control ring assembly 60 includes the same rail rings 18 as in the other embodiments but the spacer-expander 61 is in the form of an inwardly opening channel instead of the outwardly opening channel like the ring 41. The ring 61 has top and bottom rows of circumferentially spaced inwardly extending legs or segments 62 connected by vertical outer legs 63 and converging from the legs 63 to outturned angled tabs 64 which engage the inner peripheries of the rail rings 18 and 19. Fulcrum support edges 65 are provided at the ends of the legs 63 and coact with the angled tabs 64 to side seal the rails 18 and 19 at the outer edges 33 of the side walls 13a and 13b of the ring groove 13. The assembly 60 operates in the same manner as the assembly 40.

In the further embodiment 70 of FIGURE 15 the spacer-expander 71 has the same inclined leg segments 72 as the segments 62 of the ring 61. These segments 72 are supported by vertical legs 73 which are offset inwardly from the peripheral outer edges of the segment. The inner ends of the segments have outturned angled tabs 74 engaging the inner peripheries of the rail rings 18. The rail rings are supported on the fulcrum edges 75 provided at the outer peripheral ends of the segments 72 and these edges co-act with the tabs 74 to side seal the rail ring against the outer peripheral edges 33 of the side wall of the ring groove. The inner ends of the segments 72 can be reinforced against collapse by an inserted perforated strut ring 76 or by circumferentially spaced fingers lanced from the segments 72 to provide reinforcing struts. The assembly 70 operates in the same manner as the assembly 40.

From the above descriptions it should therefore be clear that the invention provides side sealing oil control ring assemblies which thrust against the outer peripheral portions of the side walls of the ring grooves and have thin rail rings or ring segments dished to diverge from their inner to their outer peripheries. The rails or segments are supported by a spacer-expander ring which forms a fulcrum support which is closer to the outer periphery of the rail ring than to the inner periphery. The inner peripheries of the rail rings are subjected to an expanding force by the spacer-expander which force has a converging force vector to coact with the fulcrum supports for dishing the rings. The assemblies of this invention minimize heretofore encountered sticking problems because the side sealing occurs at the outer peripheries of the side walls of the ring groove and seals off gaps which could collect lacquer or other contaminants causing sticking.

Although I have herein set forth my invention with respect to certain specific principles and details thereof, it will be understood that these may be varied without departing from the spirit and scope of the invention.

I claim as my invention:

1. A piston ring assembly comprising a pair of cylinder engaging rails and spacer and expander means for supporting the rails in axially spaced relation, said spacer and expander means bearing against the inner peripheries of the rails at an angle which is inclined axially outward and radially outward to exert an expanding force dishing the rails into sealing engagement with the outer peripheral portions of a ring groove in which the assembly is seated.

2. The ring assembly of claim 1 wherein the spacer-expander is a radially corrugated metal ribbon with circumferentially spaced humps having side edges providing fulcrum supports for the rail rings, the humps being connected by circumferentially spaced legs at the inner periphery of the ring and the legs having angled tabs at the top and bottom edges thereof extending axially outward and radially outward for engaging the inner peripheries of the rail rings.

3. The spacer-expander of claim 2 wherein the angled tabs are inclined axially outward and radially outward at an angle of from two to thirteen degrees.

4. An oil control piston ring assembly comprising a pair of cylinder engaging flat rails each capable of being dished, and spacer and expander means supporting the rails in axially spaced relation and bearing against the inner peripheries of the rails at an angle to cause the rails to dish toward the sides of the ring groove near their outer peripheries while simultaneously forcing the rails radially outward.

5. A piston ring assembly comprising a pair of thin segment rings, a spacer-expander between said rings supporting the rings near their outer peripheries, and angled tabs on said spacer-expander engaging the inner peripheries of the rail segments to exert an expanding force thereon in a direction causing the rails to dish and seal against the outer peripheral portions of the side walls of a ring groove in which the assembly is seated.

6. An oil control piston ring assembly which comprises a pair of cylinder wall engaging thin ring segments adapted to be dished from a flat free state condition to an inclined condition, a spacer-expander between said segments having support edges engaging the segments radially outward from their inner edges, angled shoulders on said spacer-expander engaging the inner peripheries of said segments and coacting with said support edges to force the segments into sealing engagement with the side walls of the piston ring groove receiving the assembly near the outer peripheral edges of the side walls.

7. A spacer-expander piston ring which comprises a metal circumferential expansion spring having top and bottom edges at its outer peripheral portion adapted to form fulcrum supports for rail rings and angled shoulders at its inner peripheral portion, said angled shoulders being inclined axially outward and radially outward for co-acting with the fulcrum supports to dish the rail rings in diverging relation from their inner to their outer peripheries.

8. A side sealing oil control piston ring assembly comprising a pair of split thin rail rings, said rings being normally flat, a circumferential spacer-expander between said rings, support areas on said spacer-expander engaging said rings near their outer peripheries, and means on said spacer-expander exerting a radial expansion force on said rings having a vector dishing the rings into diverging relation.

9. The ring assembly of claim 8 wherein the spacer-expander is an outwardly opening channel ring composed of top and bottom rows of circumferentially spaced segments converging from outer peripheral edges to axially outturned and radially inclined angled tabs on the inner peripheral edges thereof and connected by upstanding legs circumferentially spaced around the inner periphery of the ring.

10. The spacer-expander of claim 9 including reinforcing struts between the top and bottom rows of segments reinforcing the rows against axial collapse.

11. The ring assembly of claim 8 wherein the spacer-expander is an inwardly opening channel ring composed of top and bottom rows of circumferentially spaced segments converging from outer peripheral edges to axially outturned and radially inclined tabs on the inner peripheral edges thereof and upstanding circumferentially spaced legs around the outer periphery of the ring connecting the top and bottom rows of segments in staggered relation.

References Cited

UNITED STATES PATENTS 3,268,234  8/1966  Knoebel _____ 277—139

LOUIS K. RIMRODT, Primary Examiner

U.S. Cl. X.R.

277—141

Disclaimer 3,481,611.—*Philip G. Stratton*, Northville, Mich. OUTER SIDE SEALING OIL CONTROL RING. Patent dated Dec. 2, 1969. Disclaimer filed May 30, 1973, by the assignee, *Ramsey Corporation*.

Hereby enters this disclaimer to claims 1 and 4 of said patent.

[*Official Gazette October 30, 1973.*]